United States Patent [19]

Zdunek

[11] 4,159,469
[45] Jun. 26, 1979

[54] METHOD AND APPARATUS FOR THE CODING AND DECODING OF DIGITAL INFORMATION

[75] Inventor: Kenneth J. Zdunek, Schaumburg, Ill.

[73] Assignee: Motorola, Inc., Schaumburg, Ill.

[21] Appl. No.: 842,701

[22] Filed: Oct. 17, 1977

[51] Int. Cl.² ............................................. G06F 11/12
[52] U.S. Cl. .................. 340/146.1 AQ; 340/146.1 AL
[58] Field of Search ........... 340/146.1 AL, 146.1 AQ, 340/146.1 AV; 325/41, 42

[56] References Cited

U.S. PATENT DOCUMENTS

| | | | |
|---|---|---|---|
| 3,222,643 | 12/1965 | Klinkhamer | 340/146.1 AL X |
| 3,873,971 | 3/1975 | En | 340/146.1 AQ |
| 3,891,959 | 6/1975 | Tsuji et al. | 340/146.1 AQ |
| 3,988,677 | 10/1976 | Fletcher et al. | 340/146.1 AL X |
| 4,055,832 | 10/1977 | En | 340/146.1 AQ |

Primary Examiner—Jerry Smith
Attorney, Agent, or Firm—James W. Gillman; James P. Hamley; Victor Myer

[57] ABSTRACT

The encoder processes M information characters, each of bit length m, followed by k-1 flush out bits, through an (n,k) convolutional encoder. Each resulting output character is stored as one row of an output register matrix. A transmission bit stream is formed by extracting bits from the register on a column by column basis, thereby interleaving the characters.

The decoder fills an input storage basis on a column by column basis, thereby restoring each character in its appropriate row. The characters are sequentially switched to an (n,k) convolutional decoder which outputs the original m bit information character. The characters are, in turn, stored in corresponding rows of an output register matrix, where they are available as recovered data.

9 Claims, 2 Drawing Figures

METHOD AND APPARATUS FOR THE CODING AND DECODING OF DIGITAL INFORMATION

BACKGROUND OF THE INVENTION

The present invention pertains to the digital communication art and, more particular, to a method, and apparatus for the coding and decoding of digital data.

Coding and decoding schemes for purposes of correcting errors in the transmission of digital data are well-known, especially in the computer and digital data communication art. Errors may occur whenever a stream of digital transmission bits, e.g. a sequence of logic "0" or "1" levels, is transmitted over a channel subject to noise interference. Such errors may be classified into two categories, namely, random errors and burst errors. Random errors are those errors which occur sporadically and, generally, do not obliterate more than a few bits in succession. Burst errors are those caused by interference which exists over several successive bit intervals.

The prior art has developed three basic coding schemes to minimize or eliminate errors in transmitted digital data. These systems are block codes, convolutional codes, and interleaving schemes.

In both burst and convolutional codes, parity bits are generated and transmitted along with the information bits. These parity bits are related to the information bits in a predetermined manner such that upon reception errors in transmission may be found. In block codes, the parity bits and information bits are sent in distinct blocks. Such block codes are particularly effective at minimizing burst errors.

Convolutional coding schemes have been developed which convolve the parity bits with the information bits. These sytems are particularly effective for eliminating random errors.

Interleaving schemes recognize that if sequential characters of information are transmitted, a burst error may destroy an entire character. Therefore, each character is broken up into several portions and these portions are interleaved such that a burst error will tend to obliterate only portions of characters whereby a suitable decoding scheme may restore the entire character.

One prior art approach has been to combine a block coding scheme with an interleaving scheme. While this system exhibits superior error correcting capabilities over any one of the prior art systems, it has a principle drawback, namely, it can only accept characters of certain defined lengths.

SUMMARY OF THE INVENTION

It is an object of this invention, therefore, to provide an improved method and apparatus for the coding and decoding of digital data.

It is a further object of the invention to provide the above described method and apparatus which is adapted to accept characters of any given bit length.

Briefly, according to the invention, an encoder encodes a total of M characters, with each character being m information bits in length. The encoder includes an (n,k) convolutional encoder selected such that $m > k$. Each character, followed by $k-1$ flush bits is fed to the (n,k) convolution encoder. A total of M output storage registers are provided, each register having a length of $(mn/k)+(k-1)\times((n/k)-1)$. Storage means are provided for storing each convolutionally encoded character m in a predetermined one of M output storage registers. Output circuitry outputs the content of the M output storage registers in a predetermined interleaved sequence, thereby forming the transmission bit stream. Preferably, the convolutionally encoded characters are stored in row by row form in the output storage means and the interleaving occurs by outputting the stored characters in a column by column sequence.

A decoder, according to the invention, is capable of decoding a transmission bit stream comprised of M interleaved characters, with each character formed by convolutionally encoding an m bit information character, followed by $k-1$ flush bits, in an (n,k) convolutional encoder selected such that $m > k$. Each character, therefore, has a bit length of $(mn/k)+(k-1)\times((n/k)-1)$. The decoder includes a total of M input storage registers, each input register having a length $(mn/k)+(k-1)\times((n/k)-1)$. The input transmission bit stream is totally de-interleaved, with each character being stored in a predetermined one of the M input storage registers. An (n,k) convolutional decoder is provided which is capable of decoding each of the M characters and outputting its corresponding m bit information character. Also provided are M output storage registers each register having a length m. A switching means sequencially processes each character stored in the M inut storage registers through the (n,k) convolutional decoder and stores each resulting m bit information character in a predetermined one of the M output registers.

Thus, the instant coding/decoding scheme exhibits superior error correcting capability due to its combining of convolutional, block and interleaving schemes and has the capability of accepting characters of any given bit length.

DETAILED DESCRIPTION OF THE PREFERRED EMBODIMENTS OF THE INVENTION

Figure 1:
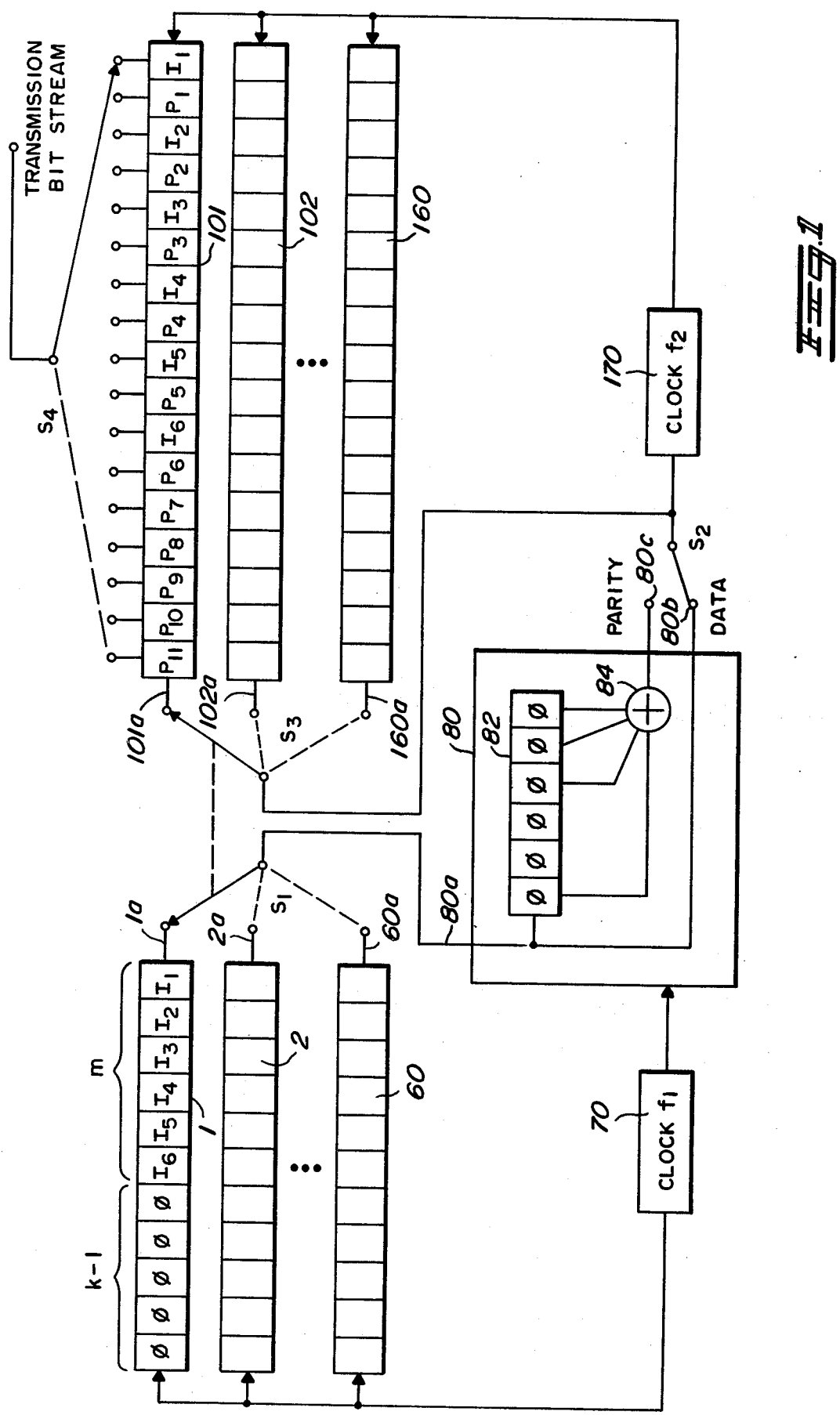
FIG. 1 illustrates the preferred embodiment of the encoder according to the invention.

FIG. 1 illustrates the preferred embodiment of an encoder according to the invention. Here, a total of $M=60$ characters, each character having a length of m information bits, $I_1-I_6$, are to be encoded. A total of $M=60$ storage registers 1-60 are provided. Each storage register, such as register 1, is capable of storing a total of $m+k-1$ bits, where k is defined by the type of convolutional encoder used, described more fully hereafter. In this, the preferred embodiment of the invention $k=6$.

Each m bit character is stored in the first m cells of each register. Thus, register 1 has stored in its first 5 cells the information bits $I_1-I_6$ which define a particular information character. The remaining $k-1=5$ cells of the register, contain flush out bits, which in the preferred embodiment of the invention are logic zeros. A clock 70 produces a clock signal of frequency $f_1$ which, when applied to the storage registers 1-60, cause the data therein to sequence out the corresponding output terminals $1_a-60_a$, respectively.

A switch $S_1$ couples to sequential ones of the output terminals $1_a-60_a$ of the storage registers 1-60 for receiving the information and flush out bits therein. Switch $S_1$ couples to the input $80_a$ of a (n,k) convolutional encoder 80. By convention, n refers to the total number of bits, i.e. information bits and parity bits, produced by the encoder whereas k represents the total number of information bits which determine each parity bit. In this, the preferred embodiment of the invention n=12 and k=6. The convolutional encoder 80 includes a storage register 82 which is k=6 bits long. Parity bits are generated by taking the modulo 2 sum, in modulo 2 adder 84, of the first, fourth, fifth and sixth positions in the k bit register 82. The outputs from the convolutional encoder 80 include the input data at output terminal $80_b$ and the parity bits at output terminal $80_c$. The clock signal $f_1$ is applied to the encoder for sequencially stepping input bits at input $80_a$ down the shift register 82.

A second switch $S_2$ responds to a second clock signal $f_2$, which signal is in phase with and at twice the frequency of the first clock signal $f_1$, to alternately couple either the first, data output $80_b$ or the second, parity output $80_c$ from the convolutional encoder 80. The switch $S_2$ coupled signal is applied to a third switch $S_3$. As is more fully described hereinbelow, switch $S_3$ parallels the operation of the first switch $S_1$ to couple those data and parity signals from switch $S_2$ to a selected one of M output registers 101–160.

In general there are provided M output registers and, since in the preferred embodiment of the invention M=60, there are 60 registers 101–160 provided in this embodiment of the encoder. Each output register, such as register 101, has a total bit length of $(mn/k)+(k-1)\times((n/k)-1)$. The output registers 101–160 are capable of inputing data bits applied to the corresponding inputs $101_a$–$160_a$, respectively, at the frequency of the second clock signal $f_2$ provided by the second clock 170.

A fourth switch, $S_4$ is operable to connect to each column formed by the M output storage registers. In this manner, the 60 first bits of each character stored in the output registers may be transferred serially to the output of switch $S_4$, which output carries the transmission bit stream suitable for transmission over a potentially noisy medium.

Operation of encoder FIG. 1 may be understood as follows. The data routing switches $S_1$ and $S_3$ are connected to the first input signal register 1 and the first output register 101, respectively. Second switch $S_2$ is initially in the "DATA" position and clock signals from the clocks 70, 170 shift all registers once, thereby loading the first infomation bit $I_1$ into the first cell of the k storage register 82 in the convolutional encoder 80 and into the first cell in the first output storage register 101. Since switch $S_2$ operates at the second clock frequency signal which runs at twice the frequency of the first clock signal, before another bit from register 1 is shifted to the encoder, a parity bit is switched into the output storage register 101. In the general case, $(n/k)-1$ parity bits would be loaded into the output registers following the loading into the output register of each information bit. In this example, $(n/k)-1=1$, whereby one parity bit follows each information bit. The above process is repeated for a total of m=6 times. The first output register 101 now contains 6 information bits and 6 parity bits. Now, second switch $S_2$ remains in the "PARITY" position and the first and second clock signals simultaneously clock $(k-1)\times((n/k)-1)=5$ more parity bits into the remaining 5 cells of the first output register 101.

The total above process repeats for a total of M=60 repetitions with data routing switches $S_1$ and $S_3$ sequentially coupling to the remaining 2–60 registers. In this manner, each cell of the output storage registers 101–160 is loaded in the form of M rows and $mn/k+(k-1)\times((n/k)-1)$ columns.

Once all output registers are loaded, the fourth switch $S_4$ connects to the first column thereby serially unloading the first bit in each register 101–160. Switch $S_4$ then switches to column 2 and so forth unloading the characters therein in an interleaved manner. In so doing, the output transmission bit stream from switch $S_4$ is an interleaved, block truncated convolutional code. Further, the encoder is capable of accepting any desired character bit lengths, m, with the simple proviso that the (n,k) convolutional encoder must be selected such that $m \geq k$.

Figure 2:
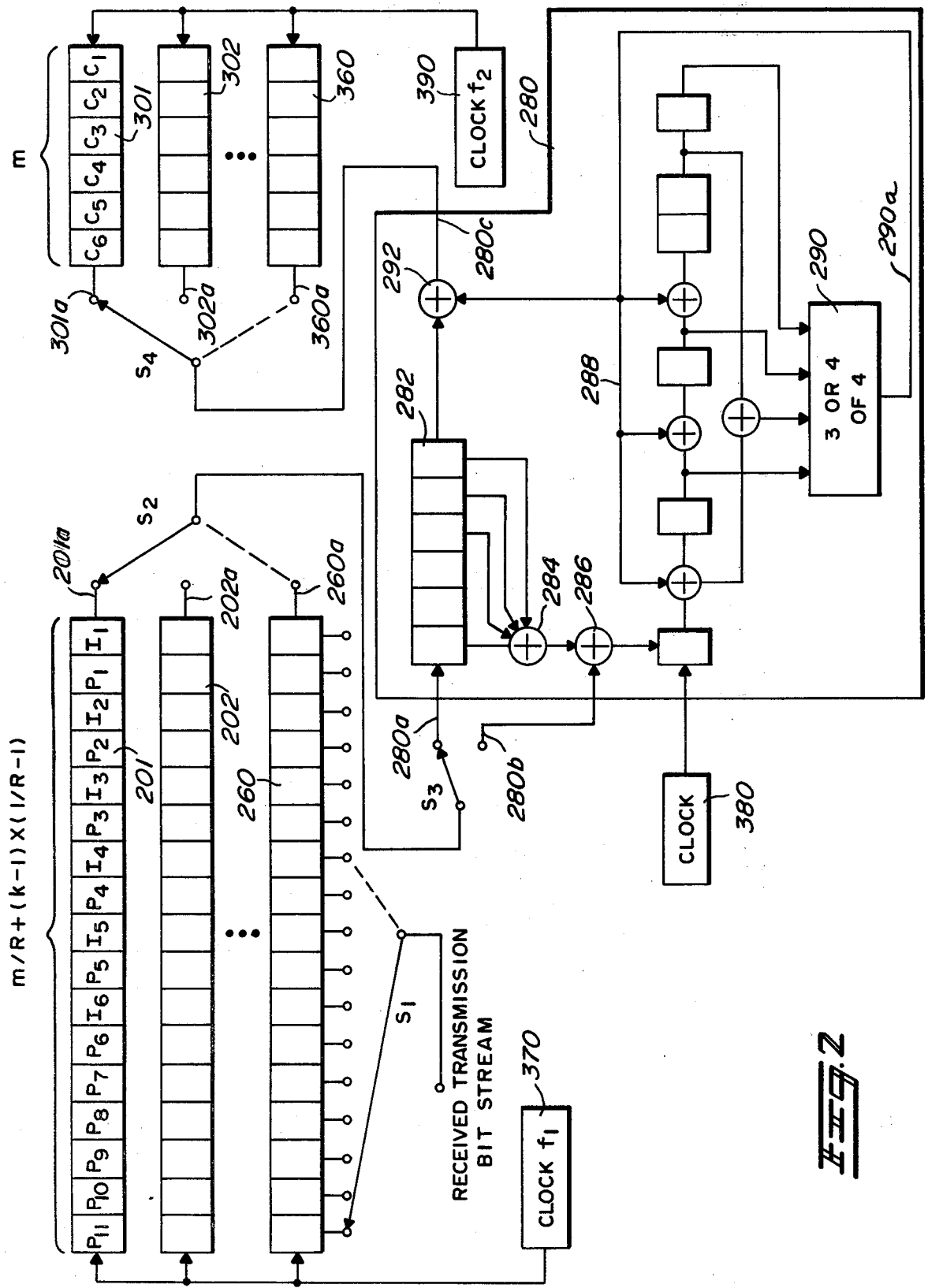
FIG. 2 illustrates the preferred embodiment of a decoder according to the invention.

FIG. 2 illustrates a preferred embodiment of a decoder capable of decoding the transmission bit stream generated by the encoder of FIG. 1. Here, the received transmission bit stream is routed to a first switch $S_1$. Switch $S_1$ serially couples to each storage input cell of a total of M input storage registers 201–260. Each input storage register has a total bit length of $(mn/k)+(k-1)\times((n/k)-1)$. Just as characters from the output storage registers 101–160 were interleaved in column by column form by the encoder of FIG. 1, the input transmission bit stream is de-interleaved by a similar column by column loading of the input storage registers 201–260. In this manner, the first storage register 201 contains the same bit sequence as did the first output storage register 101 of the encoder in FIG. 1.

A second switch $S_2$ is actuable to connect to any one of the outputs $201a$–$260a$ of the M input storage registers. Switch $S_2$, in turn, feeds to a third switch $S_3$ which couples to the information input $280a$ or the parity bit input $280b$ of a (12, 6) convolutional decoder 280.

The (12, 6) convolutional decoder 280 is of conventional design. It is comprised of a k=6 information bit storage register 282, with selective outputs therefrom feeding a modulo 2 adder 284. The output from modulo 2 adder 284 is modulo 2 added with an input at the parity input $280b$ in a second modulo 2 adder 286. The output from the second modulo 2 adder 286 is fed to a conventionally designed syndrome register indicated generally at 288. Syndrome register 288 is, as shown, comprised of storage cells interspersed with modulo 2 adders which feed a threshold detector 290. As is wellknown to one of skill in the coding art, the threshold detector 290 determines the orthogonalizable error correcting capability of the decoder. That is, if the input to the threshold detector indicates at least three out of four errors are detected corresponding to a particular information bit, the threshold detector 290 applies a logic level 1 on its output line $290a$ which is fed to an output modulo 2 adder 292. The other input to output modulo 2 adder 292 is the output from the k storage resistor 282. Thus, once the output from the syndrome register 288, as interpreted by the threshold detector 290, determines that the information bit contained in the last cell of the k bit storage register 282 is an error, this bit is subsequently corrected to its proper value via the action of the output modulo 2 adder 292. To also correct this bit in the syndrome register, the output $290a$ of the threshold detector 290 is fed back to appropriate modulo 2 adders in the syndrome register 288 thereby similiarly correcting the error.

The output $280c$ from the (12, 6) convolutional decoder 280 is fed to a fourth switch $S_4$. This switch is arranged to sequentially connect to the inputs $301_a$–$360_a$ of a total of m=60 output storage registers 301-360. Each output register has a total bit length equal to m=6. As is more fully described hereinbelow, the operation of the (12, 6) convolutional decoder 280 is to output each m bit information character as regenerated from the input encoder character stored in the M input storage registers 201-260. Thus, in this manner, the original m bit information characters are stored in the output registers 301-360 and the decoding is complete.

Operation of the decoder may be understood as follows. Initially, the data routing switches $S_2$ and $S_4$ are connected to the first input storage register 201 at its output 201a and to the first 301 of the M output storages registers at its input 301a. Switch $S_3$ is initially in the "I" position and a signal generated by a first clock 370 operating at a frequency $f_1$ loads the first information bit $I_1$ into the convolutional decoder. Switch $S_3$ then moves to the "P" position and a second clock 380 transfers $(m/k)-1=1$ received parity bits into the convolutional decoder. This step is repeated $(k-1)=5$ times followed by $(m-k+1)=1$ more time with the addition of the following: a third clock 390 strobes an output corrected bit into the first output register 301. Now, a total of $(m-k+1)=1$ corrected bit is stored in the output register bit.

Switch $S_3$ remains in the "P" position and the second clock 380 strobes $(n/k)-1=1$ parity bit into the decoder 280. The third clock 390 now strobes another corrected bit into the output register. These latter two steps are repeated $(k-1)=5$ further times, until a total of $m=6$ corrected bits are contained in the output register, i.e. the first output register 301 contains the fully recovered m bit information character. The complete above defined cycle is repeated $M=60$ times thereby decoding each of the 60 encoded characters and filling the $M=60$ output registers 301-360 with the recovered m bit information characters.

Performance data on the above described coder/decoder system has been taken, and Table I tabulates the results as compared to conventional prior art coding schemes. The coder/decoder of FIGS. 1 and 2 is designated as the (17,6) new coding scheme. This, because if the system utilizes a $(n,k)=(12,6)$ convolutional encoder, the resulting code from the new system is of the type $[n+(k-1),k]=(17,6)$. Also shown are the results from an (29,12) coder/decoder, according to the invention, which corresponds to a character length $m=12$. As can be clearly seen from the table, whereas coding schemes according to the instant invention result in a slightly reduced rate, the error correcting capabilities are significantly superior to prior art designs.

TABLE I

Error Correcting Ability
(Fraction of Error Patterns Correctable).
= # Patterns correctable/Total # of Patterns

| Code | Rate | 1 Bit Patterns | 2 Bit Patterns | 3 Bit Patterns | 4 Bit Patterns | 5 Bit Patterns |
|---|---|---|---|---|---|---|
| (17,6)new | .35 | All | All | 424 680 | 1208 2380 | 590 6188 |
| (15,7)BCH | .46 | All | All | 74/455 2966 | — 12033 | — |
| (29,12)new | .415 | All | All | All | 3654 | 23751 |
| (23,12)Golay | .512 | All | All | All | None | None |

In summary, an improved method and apparatus for the coding and decoding of digital data bit streams have been shown. This system has been shown to be capable of accepting any given character bit length m and to exhibit superior error correcting capabilities over coding schemes of the prior art.

While a preferred embodiment of the invention has been described in detail, it should be apparent that many modifications and variations thereto are possible, all of which fall in the true spirit and scope of the invention.

I claim:

1. A digital data encoder for encoding a total of M characters, each with a length of m information bits, comprising:

(n,k) convolutional encoder means selected such that $m \geq k$;

means for feeding each character, followed by $k-1$ flush bits, to said (n,k) convolutional encoder;

M output storage registers, each register of length $(mn/k)+(k-1)\times((n/k)-1)$;

storing means for storing each convolutionally encoded character M in a predetermined one of said M output storage registers; and output means for outputting the contents of said M output storage registers in a predetermined interleaved sequence.

2. The digital data encoder of claim 1 wherein:

said M output storage registers are arranged in a matrix of M rows and $mn/k+(k-1)\times((n/k)-1)$ columns, and wherein said output means outputs the contents of said M output storage registers in a column by column sequence.

3. The digital data encoder of claim 2 wherein said (n,k) convolutional encoder is comprised of:

a shift register of length k into which each m length character followed by $k-1$ flush bits are sequentially shifted and, parity bit generating means for generating predetermined parity bits dependent upon the status of one or more of the signals in said register, and wherein the storing means includes means for alternately outputting each of the m information bits followed by $(n/k)-1$ parity bits until all m information bits followed by $(n/k)-1$ parity bits are stored in one of said M output registers, said output means then outputting $(k-1)\times(n/k)-1)$ parity bits to fill said output register.

4. The digital data encoder of claim 1 wherein said (n,k) convolutional encoder is comprised of:

a shift register of length k into which each m length character followed by $k-1$ flush bits are sequentially shifted and, parity bit generating means for generating predetermined parity bits dependent upon the status of one or more of the signals in said register, and wherein the storing means includes means for alternately outputting each of the m information bits followed by $(n/k)-1$ parity bits until all m information bits followed by $(n/k)-1$ parity bits are stored in one of said M output registers, said output means then outputting $(k-1)\times((n/k)-1)$ parity bits to fill said output register.

5. A method for encoding a total of M characters, each character having a length of m information bits, comprising the steps of:

(a) providing an (n,k) convolutional encoder;

(b) sequentially feeding each character, followed by $k-1$ flush bits, to said (n,k) convolutional encoder;

(c) providing M output storage registers, each output register having a length $(mn/k)+(k-1)\times((n/k)-1)$;

(d) storing each convolutionally encoded character in a predetermined one of said M output storage registers; and (e) outputing said stored convolutionally encoded characters in a predetermined interleaved sequence.

6. The method of claim 5 wherein said storing step further comprises the step of storing said convolutionally encoded characters in a matrix of M rows and $(mn/k)+(k-1)\times((n/k)-1)$ columns and wherein said outputing step comprises outputing the contents of said M output storage registers in a column by column sequence.

7. The method of claim 5 wherein the step of providing a convolutional encoder further comprises the steps of:

(a) providing a shift register of length k, (b) providing parity bit generating means for generating predetermined parity bits dependent upon the status of one or more of the signals in said k length register;

and wherein the outputing step comprises the further steps of:

(a) storing each of the m information bits followed by $(n/k)-1$ parity bits until all of said m information bits followed by $(n/k)-1$ parity bits are stored in one of said M output registers and then (b) outputing $(k-1)\times((n/k)-1)$ parity bits to fill said output register.

8. A decoder for decoding a transmission bit stream comprised of M interleaved characters, each character formed by convolutionally encoding an m bit information character, followed by $k-1$ flush bits, in an $(n,k)$ convolutional encoder selected such that $m \geq k$, each character having a bit length of $(mn/k)+(k-1)\times((n/k)-1)$, the decoder comprising:

M input storage registers, each input register having a length $(mn/k)+(k-1)\times((n/k)-1)$;

means for de-interleaving said M characters from said transmission bit stream and storing each character in a predetermined one of said M input storage registers;

an $(n,k)$ convolutional decoder for decoding each of said characters and outputting said m bit information character;

M output storage registers, each output register having a length m; and switching means for sequentially processing each character stored in said M input storage registers through said $(n,k)$ convolutional decoder and storing each resulting m bit information character in a predetermined one of said M output registers.

9. A method for decoding a transmission bit stream comprised of M interleaved characters, each character formed by convolutionally encoding an m bit information character, followed by $k-1$ flush bits, in an $(n, k)$ convolutional encoder selected such that $m \geq k$, each character having a bit length of $(mn/k)+(k-1)\times((n/k)-1)$, comprising the steps of:

(a) providing M input storage registers, each register of length $(mn/k)+(k-1)\times((n/k)-1)$;

(b) de-interleaving the M characters from the transmission bit stream and storing each character in a predetermined input register;

(c) providing an $(n, k)$ convolutional decoder for decoding each of characters and outputing said m bit information characters;

(d) providing M output storage registers, each output register of length m; and (e) sequentially processing each character stored in said M input storage registers through said $(n,k)$ convolutional decoder and storing each resulting m bit information character in a predetermined one of said M output registers.

* * * * *